United States Patent Office 2,695,293
Patented Nov. 23, 1954

2,695,293

N,N'-SUBSTITUTED DIAMINE COMPOUNDS AND METHOD OF MAKING THE SAME

Ansel P. Swain, Springfield Township, Montgomery County, Pa., assignor to McNeil Laboratories, Incorporated, Philadelphia, Pa., a corporation of Pennsylvania No Drawing. Application December 19, 1952,
Serial No. 327,043

6 Claims. (Cl. 260—268)

The present invention relates to novel chemical compounds and to the method of preparing the same; and, more particularly, it relates to N,N'-bis(phenoxyethyl) ethylenediamines possessing valuable sypatholytic properties.

There are mentioned in the literature and available on the market certain chemical compounds which possess sympatholytic properties, that is, they have the ability to prevent the actions of epinephrine and similar neurohormones in the human body and are able to diminish or prevent the activity of the sympathetic nervous system. These agents possess certain limitations, however, which severely restrict their field of use. Benzodioxanylmethyl piperidine, benzodioxanylmethyl diethylamine and benzodioxanylmethyl piperazine, for example, can only be administered by injection and have only transient effects against circulating epinephrine. Such compounds are not effective in blocking the sympathetic nervous system and are even toxic at the levels that are only partially effective; they are not usefully active on oral administration. Other compounds, while possessing more definite sympatholytic properties, are limited to administration by injection since they have an irritating or corrosive effect on the stomach and intestinal wall if taken orally.

An important advantage of the novel compounds of the present invention is that they do not produce the toxic effects that have been observed following the parenteral or oral administration of other sympatholytic agents; that is, they do not produce nausea, vomiting, tissue irritation, coronary constriction, and the like effects on the heart, blood vessels and viscera.

The principal object of the present invention is to provide new chemical compounds possessing advantageous pharmaceutical properties.

Another object of the invention is to provide chemical compounds possessing valuable sympatholytic properties, which can be administered orally as well as by injection.

A further object is to provide chemical compounds which are effective in blocking the sympathetic nervous system as well as injected epinephrine and which may be administered orally as well as by injection for these purposes.

Other objects including the provision of a method of making the novel compounds will be apparent from a consideration of this specification and the claims.

In copending applications of Ansel P. Swain, Serial Numbers 327,044 and 327,045, both filed December 19, 1952, are disclosed and claimed compounds related to those of the present invention as well as the method of preparing the same and reference may be made, if desired, to said copending applications as amplifying the present disclosure.

The novel compounds of the present invention are N,N'-bis(phenoxyethyl) ethylenediamine compounds having the following fundamental structural formula:

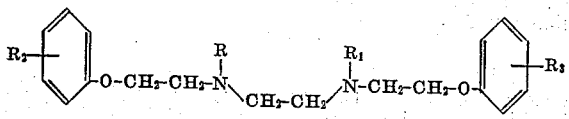

where R and $R_1$ are selected from the group consisting of hydrogen, alkyl groups containing from 1 to 3 carbon atoms, phenoxyethyl groups

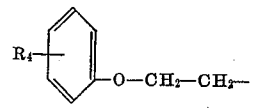

and a joined dimethylene linkage —$CH_2$—$CH_2$— to complete the piperazine ring

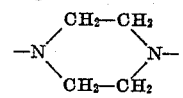

and where $R_2$, $R_3$ and $R_4$ are selected from the group consisting of hydrogen, methyl and methoxy.

The compounds of the present invention may be symmetrical or unsymmetrical, that is to say, in the formula given above, the R and $R_1$ groups may be identical or may be different, and the $R_2$ and $R_3$ groups may be identical or different. Appropriate methods of preparing the symmetrical and unsymmetrical compounds are set forth hereinafter. In addition, the exact position of the $R_2$, $R_3$ and $R_4$ groups, when methyl or methoxy, on the benzene ring portion of the phenoxyethyl groups is not critical and they may be on the 2, 3 or 4 position, or the product may even be made up of a mixture of compounds differing as to the position of the $R_2$, $R_3$ and $R_4$ groups.

As stated, the R and $R_1$ groups in the above formula may be hydrogen or alkyl groups containing from 1 to 3 carbon atoms, that is, methyl, ethyl, n-propyl and isopropyl. Either or both of R and $R_1$ may also be a phenoxyethyl group

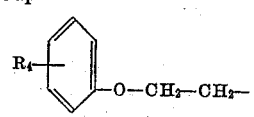

where $R_4$, as is the case with $R_2$ and $R_3$, may be hydrogen, methyl and methoxy. When R and $R_1$ are both phenoxyethyl groups they may be different or the same. In addition, when either or each of R and $R_1$ is a phenoxyethyl group, such group or groups may correspond to one or both of the 2-phenoxyethyl groups of the fundamental structural formula or may differ therefrom.

The preferred compounds from the standpoint of highest sypatholytic activity are those in which, in the above formula, R and $R_1$ join through a dimethylene linkage (—$CH_2$—$CH_2$—) to complete the piperazine ring

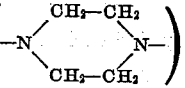

and thus the preferred compounds are the N,N'-bis-(phenoxyethyl) piperazines, particularly the symmetrical N,N'-bis(phenoxyethyl) piperazines. In this connection, the N,N'-bis(2-phenoxyethyl) piperazine compound, that is where $R_2$ and $R_3$ are both hydrogen, is a particularly advantageous sypatholytic agent.

The compounds of the present invention all possess valuable sympatholytic properties that are effective in blocking epinephrine and other neurohormones, whether the latter be injected or elaborated physiologically in the body. The compounds find particular utility, in addition to known uses for sympatholytic agents, in the treatment of hypertension. Moreover, the compounds can readily be administered orally without being toxic or producing other deleterious physiological effects, and are effective for the stated purposes when so administered. The compounds will range in activity from that of prior available sympatholytic agents to an activity many times greater. In this connection, the preferred group of compounds discussed above possess activity up to about ten times that of sympatholytic agents available commercially prior to this invention when administered parenterally, and when administered orally, up to twenty to fifty times that obtained upon oral administration of prior agents.

In the compounds of the present invention there are two basic nitrogens to which one or two equivalents of acid may be added to form a mono- or disalt. Hence, the compounds of the invention may be prepared and/or employed either as the base or as a salt. Thus, for example the structural formula for the dihydrochloride of the compounds of the present invention may be written as fololws:

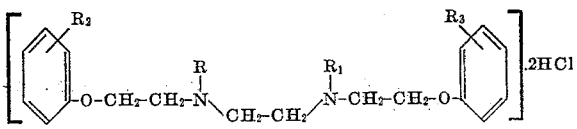

In view of the fact that the salts differ from the bases in the addition of the acid to the nitrogen atoms referred to, and are characterized by the same fundamental structural formula, the salts as well as the bases, are included within the scope of this application and of the claims wherever reference is made to a compound comprising the stated structure.

The acid forming the salt may be any inorganic or organic acid desired, for example, hydrochloric, hydrobromic, hydroiodic, nitric, sulphuric, phosphoric, and the like; acetic, propionic, caproic, stearic, and other acids in this series, and the like; crotonic, oleic, oxalic, citric, tartaric, lactic, benzoic, naphthoic, picric, salicylic, dilituric, methane sulphonic, camphor sulphonic, and the like. When a salt is to be administered any toxicity which may be imparted by the acid will be taken into consideration as well known in the art.

The compounds of the present invention are readily prepared by condensing two moles of an appropriate phenoxyethyl derivative possessing alkylating properties with one mole of an appropriate diamine providing the desired group:

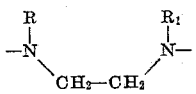

The diamine base itself may be used or a salt or hydrate thereof. As will appear hereinafter in the preparation of compounds in which R and/or $R_1$ is hydrogen, or of compounds in which the phenoxyethyl groups differ, in which cases a multi-step reaction is employed, the diamine compound may, during the first stage, have a readily removable blocking group attached to one or both nitrogen atoms for purposes known to those skilled in the art. All such compounds are included herein within the term "diamine compound." The fundamental structural formula for the diamine compound is represented by:

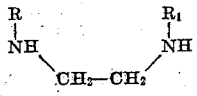

and for the phenoxyethyl derivative by:

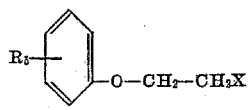

where R and $R_1$ are as hereinabove defined, where $R_5$ corresponds to the hereinabove-defined $R_2$, $R_3$ and $R_4$ groups and where X is a halogen such as chlorine, bromine, iodine, and the like, sulfate or phosphate group.

Where, in the final product, $R_2$ and $R_3$ are to be identical, the two moles of phenoxyethyl derivative can be made up of a single compound and then reacted in one step with the diamine compound. In such compounds, where R and/or $R_1$ is to be hydrogen, it is preferable, in order to prevent substitution of such hydrogen with the phenoxyethyl group during the reaction initially to substitute for such hydrogen in the diamine compound reactant, a readily removable blocking group. An example of such a blocking group is the benzenesulfonyl group ($C_6H_5SO_2$—). Following the reaction, the blocking group can be removed as by hydrolysis providing the desired hydrogen for R and/or $R_1$. Where $R_2$ and $R_3$ are to be different, the alkylation reaction can be carried out in two steps, by first reacting one mole of diamine compound with one mole of a phenoxyethyl derivative providing the desired $R_2$, and then reacting the resulting product with one mole of another phenoxyethyl derivative providing the desired $R_3$. In this connection, it is preferable to block, during the first reaction, one of the nitrogen atoms so that the first phenoxyethyl derivative selectively reacts with the other nitrogen atom. An example of such a blocking group is a carbalkoxy group, such as the carbethoxy group ($C_2H_5OOC$—) or the carbobenzyloxy group ($C_6H_5CH_2OOC$—). Following this first reaction step, therefore, the blocking group may be removed as by hydrolysis and the resulting product subjected to the second reaction step with the second phenoxyethyl derivative.

In the case that R and/or $R_1$ is to be a phenoxyethyl group corresponding to the 2-phenoxyethyl groups in the above fundamental formula, the reaction between the diamine compound and the appropriate number of moles, either three or four, as the case may be, of phenoxyethyl derivative may be carried out in one step. As will be apparent from the above, however, where R or $R_1$ is to be hydrogen or where R and/or $R_1$ is to be a phenoxyethyl group differing from the 2-phenoxyethyl group illustrated in the fundamental formula, the reaction can be carried out in separate steps, appropriate blocking groups being employed, to insure the desired course of the reactions.

The reaction between the diamine compound and the halomethyl benzodioxan may be carried out in alkaline aqueous- or alcohol medium. When an aqueous medium is employed, the alkali used is advantageously sodium hydroxide, and when an alcohol medium is employed, the alkali used is advantageously sodium carbonate. It is desirable to heat the reaction mixture until the reaction is complete, and in this connection refluxing is preferred. After the reaction is as complete as desired, the product may be conveniently separated from the reaction mixture by removal of part or all of the solvent used, or by filtration if the product is a solid. If the product is liquid, it may be removed by extraction with a suitable solvent such as ether. In isolating the product it may be desirable to recover it as a salt and this may be accomplished by treating the reaction product or an extract thereof with a suitable acid of the type discussed hereinabove.

The following examples serve to illustrate further the present invention.

*Example I*

A mixture of 19.4 g. (0.1 gram mole) of piperazine hexahydrate, 40.1 g. (0.2 gram mole) of 2-phenoxyethyl bromide and 8 g. (0.2 gram mole) of sodium hydroxide in 25 ml. of water is heated for 24 hours under an atmosphere of nitrogen. The solid which separates on cooling is collected and crystallized from acetone to yield white crystals melting at 88–89° C. The calculated N content for $C_{20}H_{26}N_2O_2$ is 8.6; that found is 8.5. The compound is N,N'-bis(2-phenoxyethyl) piperazine having the formula:

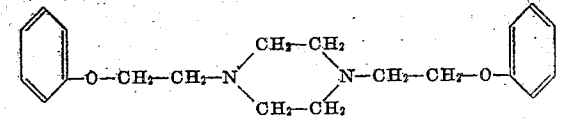

By substituting 2-(methylphenoxy) ethyl bromide and 2-(methoxyphenoxy) ethyl bromide for the 2-phenoxyethyl bromide of this example, the corresponding N,N'-bis[2-(methylphenoxy) ethyl] piperazine compounds and N,N'-bis[2-(methoxyphenoxy) ethyl] piperazine compounds, respectively, may be prepared.

*Example II*

The filtrate from the crude solid recovered in Example I is extracted with ether, and the ether extract is thoroughly dried. Addition of a solution of anhydrous hydrogen chloride in dry ether causes the precipitation of the dihydrochloride of N,N'-bis(2-phenoxyethyl) piperazine in the form of shiny white crystals melting at 255° C. The calculated N content for $C_{20}H_{28}Cl_2N_2O_2$ is 7.0; that found is 6.9.

*Example III*

A mixture of 6.3 g. (0.1 gram mole) of 95% ethylenediamine, 80.2 g. (0.4 gram mole) of 2-phenoxyethyl bromide and 16.0 g. (0.4 gram mole) of sodium hydroxide in 50 ml. of water is heated at 110° C. for 48 hours. The reaction mixture is diluted with water and extracted with ether. Addition of 6 normal hydrochloric acid to the ether extract causes the separation of a solid which is collected by filtration and crystallized from methanol to yield white crystals melting at 202–203° C. The calculated N content for $C_{34}H_{42}Cl_2N_2O_4$ is 4.6; that found is 4.6.

The compound is N,N,N',N'-tetrakis (2-phenoxyethyl) ethylenediamine dihydrochloride having the formula:

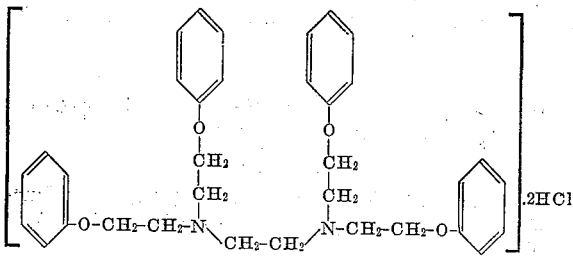

By substituting 2-(methylphenoxy) ethyl bromide and 2-(methoxyphenoxy) ethyl bromide for the 2-phenoxyethyl bromide of this example the corresponding N,N,N',N'-tetrakis [2-(methylphenoxy) ethyl] ethylenediamine compounds and N,N,N',N'-tetrakis [2-(methoxyphenoxy) ethyl] ethylenediamine compounds may be prepared.

By substituting for one hydrogen of one of the amine groups of the ethylenediamine a benzenesulfonyl group, and reacting three molar equivalents of the desired 2-phenoxyethyl bromide with the resulting compound, followed by removing the benzenesulfonyl group by hydrolysis, the corresponding N,N,N'-tris(2-phenoxyethyl) ethylenediamine compounds may be prepared. By further reacting such compound with a methyl-, ethyl- or propyl iodide in an alcoholic solution in the presence of sodium carbonate, the corresponding N,N,N'-tris(2-phenoxyethyl)-N'-alkylethylenediamine compounds may be prepared.

*Example IV*

A mixture of 34.0 g. (0.1 gram mole) of N,N'-ethylenebisbenzenesulfonamide, 40.2 g. (0.2 gram mole) of 2-phenoxyethyl bromide, 100 ml. of methanol, 8 g. (0.2 gram mole) of sodium hydroxide and 25 ml. of water is refluxed for nine hours. Upon cooling, the mixture deposits a solid which is collected by filtration, washed with water and dried. Recrystallization from acetone gives white crystals, melting at 136–137° C. The calculated nitrogen content for $C_{30}H_{32}N_2O_6S_2$ is 4.9; that found is 4.9. The compound is N,N'-bis(2-phenoxyethyl)-N,N'-ethylenebisbenzenesulfonamide.

24.8 g. of this compound is mixed with 300 ml. of freshly distilled hydrobromic acid and 40 g. phenol, and the mixture boiled for an hour to remove the benzenesulfonamide groups. The reaction mixture is cooled, made alkaline with sodium hydroxide and extracted with ether. Treatment of the dried ether extract with anhydrous hydrogen chloride and crystallization of the resulting solid from a mixture of methanol and water gives white crystals, melting at 277° C. with decomposition. The calculated nitrogen content for $C_{18}H_{26}Cl_2N_2O_2$ is 7.5; that found is 7.4.

The compound is N,N'-bis(2-phenoxyethyl) ethylenediamine dihydrochloride having the formula:

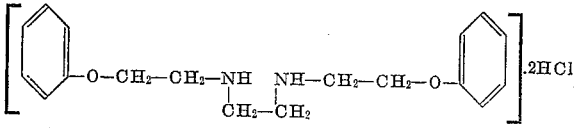

The corresponding methyl- and methoxyphenoxyethyl compounds may be prepared by substituting 2-(methylphenoxy) ethyl bromide and 2-(methoxyphenoxy) ethyl bromide, respectively, for the 2-phenoxyethyl bromide in this example.

By reacting the N,N'-bis(2-phenoxyethyl) ethylenediamine or N,N'-bis(methyl- or methoxy substituted 2-phenoxyethyl) ethylenediamine with an equimolar amount of ethyl chlorocarbonate while maintaining the pH at about 3.5, the corresponding N,N'-bis[2-phenoxyethyl (or substituted 2-phenoxyethyl)]-N-carboethoxyethylenediamine may be prepared. By reacting such compound with an equimolar amount of methyl-, ethyl- or propyl chloride, followed by removal of the carboethoxy group by hydrolysis, the corresponding N,N'-bis[2-phenoxyethyl (or substituted 2-phenoxyethyl)]-N'-alkylethylenediamine compounds may be prepared.

*Example V*

A mixture of 40.2 g. (0.2 gram mole) of 2-phenoxyethyl bromide, 16.2 g. (0.1 gram mole) of N,N'-dimethylethylenediamine dihydrochloride and 16 g. (0.4 gram mole) of sodium hydroxide in 50 ml. of water is refluxed for 24 hours, cooled, diluted with water and extracted with ether. The ether layer is extracted several times with an equal volume of 6 normal hydrochloric acid. The acid extract is neutralized with potassium carbonate and extracted with ether. After thorough drying, the ether solution is treated with anhydrous hydrogen chloride. The white solid which separates is collected by filtration and recrystallized from a mixture of methanol and ether to give white crystals melting at 224° C. with decomposition. The calculated nitrogen analysis for $C_{20}H_{30}Cl_2N_2O_2$ is 7.0; that found is 7.0.

The compound is N,N'-bis(2-phenoxyethyl)-N,N'-dimethylethylenediamine dihydrochloride having the formula:

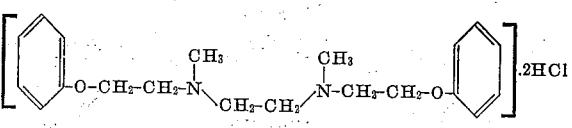

As in the foregoing examples, the corresponding N,N'-bis(methyl- or methoxy substituted 2-phenoxyethyl)-N,N'-dimethylethylenediamine compounds may be prepared by substituting 2-(methylphenoxy) ethyl bromide and 2-(methoxyphenoxy) ethyl bromide, respectively, for the 2-phenoxyethyl bromide of this example.

*Example VI*

A mixture of 40.2 g. (0.2 gram mole) of 2-phenoxyethyl bromide, 18.9 g. (0.1 gram mole) of N,N'-diethylethylenediamine dihydrochloride and 16.0 g. (0.4 gram mole) of sodium hydroxide in 50 ml. of water is refluxed for 24 hours, cooled, diluted with water and extracted with ether. The ether layer is extracted several times with an equal volume of 6 normal hydrochloric acid. The acid extract is neutralized with potassium carbonate and extracted with ether. After thorough drying, the ether solution is treated with anhydrous hydrogen chloride. The white solid which separates is collected by filtration and recrystallized from a mixture of methanol and ether to give white crystals melting at 166° C. The calculated nitrogen content for $C_{22}H_{34}Cl_2N_2O_2$ is 6.5; that found is 6.7. The compound is N,N'-bis(2-phenoxyethyl)-N,N'-diethylethylenediamine dihydrochloride having the formula:

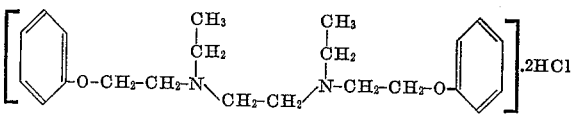

By substituting 2-(methylphenoxy) ethyl bromide and 2-(methoxyphenoxy) ethyl bromide for the 2-phenoxyethyl bromide of this example, the corresponding N,N'-bis(methyl- or methoxy substituted 2-phenoxyethyl)-N,N'-diethylethylenediamine dihydrochlorides may be prepared.

The corresponding N,N'-bis(2-phenoxyethyl)-N,N'-dipropylethylenediamine compounds may be prepared by substituting N,N'-dipropylethylenediamine dihydrochloride for the N,N'-diethylethylenediamine dihydrochloride.

Considerable modification is possible in the selection of the various substituents as represented by the "R" groups defined above, as well as in the particular techniques employed in preparing the compounds without departing from the scope of the invention.

I claim:

1. N,N'-bis(phenoxyethyl) ethylenediamine compounds having the fundamental structural formula:

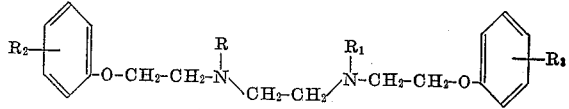

where R and $R_1$ are selected from the group consisting of hydrogen, alkyl groups containing from 1 to 3 carbon atoms, phenoxyethyl groups

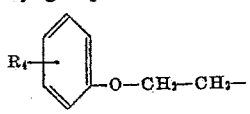

and a joined dimethylene linkage —CH₂—CH₂— to complete the piperazine ring

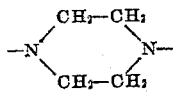

and where R₂, R₃ and R₄ are selected from the group consisting of hydrogen, methyl and methoxy.

2. An N,N'-bis(2-phenoxyethyl) piperazine compound having the fundamental structural formula:

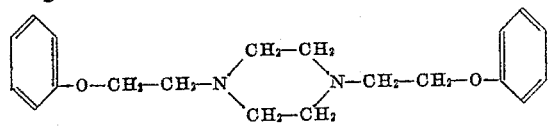

3. An N,N'-bis[2-(methylphenoxy) ethyl] piperazine compound having the fundamental structural formula:

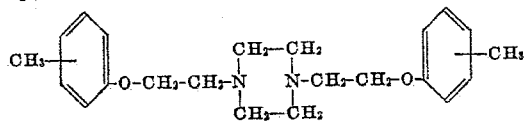

4. An N,N'-bis(2-phenoxyethyl) ethylenediamine compound having the fundamental structural formula:

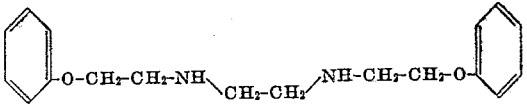

5. An N,N'-bis[2-(methylphenoxy) ethyl]-N,N'-dimethylethylenediamine compound having the fundamental structural formula:

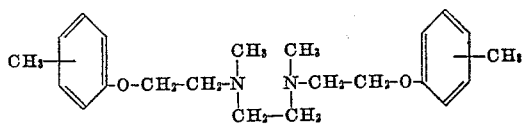

6. An N,N,N',N'-tetrakis (2-phenoxyethyl) ethylenediamine compound having the fundamental structural formula:

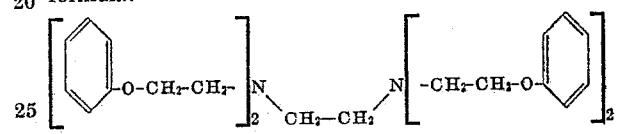

No references cited.